United States Patent
Singh (10) Patent No.: US 9,858,004 B2
(45) Date of Patent: Jan. 2, 2018

(54) METHODS AND SYSTEMS FOR GENERATING HOST KEYS FOR STORAGE DEVICES

(71) Applicant: Samsung Electronics Co., Ltd., Suwon-si, Gyeonggi-do (KR)

(72) Inventor: Banmeet Singh, Karnataka (IN)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 252 days.

(21) Appl. No.: 14/694,211

(22) Filed: Apr. 23, 2015

(65) Prior Publication Data
US 2015/0378634 A1    Dec. 31, 2015

(30) Foreign Application Priority Data

Jun. 27, 2014 (IN) .......................... 3480/CHE/2013

(51) Int. Cl.
| | |
|---|---|
| *G06F 15/16* | (2006.01) |
| *G06F 3/06* | (2006.01) |
| *H04L 29/08* | (2006.01) |
| *H04L 9/08* | (2006.01) |

(52) U.S. Cl.
CPC .......... *G06F 3/0622* (2013.01); *G06F 3/0637* (2013.01); *G06F 3/0688* (2013.01); *H04L 9/0836* (2013.01); *H04L 9/0894* (2013.01); *H04L 67/1097* (2013.01); *H04L 2209/603* (2013.01)

(58) Field of Classification Search
CPC .............................. H04L 9/0836; H04L 9/0869
See application file for complete search history.

(56) References Cited

U.S. PATENT DOCUMENTS

| | | | |
|---|---|---|---|
| 7,224,804 B2 | 5/2007 | Ishiguro et al. | |
| 7,272,229 B2 | 9/2007 | Nakano et al. | |
| 7,308,583 B2 | 12/2007 | Matsuzaki et al. | |
| 7,421,081 B2 | 9/2008 | Zhang et al. | |
| 8,160,246 B2 | 4/2012 | Kim et al. | |
| 8,223,972 B2 | 7/2012 | Ito et al. | |
| 8,290,154 B2 | 10/2012 | Cao et al. | |
| 8,411,865 B2 | 4/2013 | Kim | |
| 2003/0081786 A1 | 5/2003 | Nakano et al. | |
| 2005/0210014 A1* | 9/2005 | Asano | G06F 21/10 |
| 2006/0129805 A1* | 6/2006 | Kim | H04L 9/0822 |
| | | | 713/158 |
| 2007/0016769 A1* | 1/2007 | Gentry | H04H 60/23 |
| | | | 713/163 |

(Continued)

OTHER PUBLICATIONS

English machine translation of Korean Foreign application priority document 10-2010-0094394 for Wang PGPub 2014/0064490.*

*Primary Examiner* — June Sison
(74) *Attorney, Agent, or Firm* — Harness, Dickey & Pierce, P.L.C.

(57) ABSTRACT

A method of generating one or more host key sets for one or more host devices may comprise: generating one or more node key sets for one or more ancestor nodes in a data structure; generating one or more node key sets for one or more leaf nodes in the data structure by using the one or more node key sets of the one or more ancestor nodes; and/or generating the one or more host key sets for the one or more leaf nodes by reusing the generated one or more node key sets of the one or more ancestor nodes and the node key sets of the one or more leaf nodes.

13 Claims, 11 Drawing Sheets

(56) References Cited

U.S. PATENT DOCUMENTS

| | | | |
|---|---|---|---|
| 2007/0174609 A1 | 7/2007 | Han et al. | |
| 2010/0054465 A1* | 3/2010 | Asano | H04L 9/0822 380/46 |
| 2014/0064490 A1* | 3/2014 | Wang | H04L 9/0836 380/278 |

* cited by examiner

| Node 0 | Node 1 | Node 2 | Node 3 | ... | Node t-2 | Node t-1 |
|---|---|---|---|---|---|---|
| $K_0$ | $h(K_0)$ | $h^2(K_0)$ | $h^3(K_0)$ | ... | $h^{t-2}(K_0)$ | $h^{t-1}(K_0)$ |
| $h^{t-1}(K_1)$ | $K_1$ | $h(K_1)$ | $h^2(K_1)$ | ... | $h^{t-3}(K_1)$ | $h^{t-2}(K_1)$ |
| $h^{t-2}(K_2)$ | $h^{t-1}(K_2)$ | $K_2$ | $h(K_2)$ | ... | $h^{t-4}(K_2)$ | $h^{t-3}(K_2)$ |
| $h^{t-3}(K_3)$ | $h^{t-2}(K_3)$ | $h^{t-1}(K_3)$ | $K_3$ | ... | $h^{t-5}(K_3)$ | $h^{t-4}(K_3)$ |
| ... | ... | ... | ... | ... | ... | ... |
| $h^2(K_{t-2})$ | $h^3(K_{t-2})$ | $h^4(K_{t-2})$ | $h^5(K_{t-2})$ | ... | $K_{t-2}$ | $h(K_{t-2})$ |
| $h(K_{t-1})$ | $h^2(K_{t-1})$ | $h^3(K_{t-1})$ | $h^4(K_{t-1})$ | ... | $h^{t-1}(K_{t-1})$ | $K_{t-1}$ |

| Node 0 | Node 1 | Node 2 | Node 3 | Node 4 | Node 5 | Node 6 | Node 7 |
|--------|--------|--------|--------|--------|--------|--------|--------|
| $K_0$ | $h(K_0)$ | $h^2(K_0)$ | $h^3(K_0)$ | $h^4(K_0)$ | $h^5(K_0)$ | $h^6(K_0)$ | $h^7(K_0)$ |
| $h^7(K_1)$ | $K_1$ | $h(K_1)$ | $h^2(K_1)$ | $h^3(K_1)$ | $h^4(K_1)$ | $h^5(K_1)$ | $h^6(K_1)$ |
| $h^6(K_2)$ | $h^7(K_2)$ | $K_2$ | $h(K_2)$ | $h^2(K_2)$ | $h^3(K_2)$ | $h^4(K_2)$ | $h^5(K_2)$ |
| $h^5(K_3)$ | $h^6(K_3)$ | $h^7(K_3)$ | $K_3$ | $h(K_3)$ | $h^2(K_3)$ | $h^3(K_3)$ | $h^4(K_3)$ |
| $h^4(K_4)$ | $h^5(K_4)$ | $h^6(K_4)$ | $h^7(K_4)$ | $K_4$ | $h(K_4)$ | $h^2(K_4)$ | $h^3(K_4)$ |
| $h^3(K_5)$ | $h^4(K_5)$ | $h^5(K_5)$ | $h^6(K_5)$ | $h^7(K_5)$ | $K_5$ | $h(K_5)$ | $h^2(K_5)$ |
| $h^2(K_6)$ | $h^3(K_6)$ | $h^4(K_6)$ | $h^5(K_6)$ | $h^6(K_6)$ | $h^7(K_6)$ | $K_6$ | $h(K_6)$ |
| $h(K_7)$ | $h^2(K_7)$ | $h^3(K_7)$ | $h^4(K_7)$ | $h^5(K_7)$ | $h^6(K_7)$ | $h^7(K_7)$ | $K_7$ |

| Node 0 | Node 1 | Node 2 | Node 3 | Node 4 | Node 5 | Node 6 | Node 7 |
|--------|--------|--------|--------|--------|--------|--------|--------|
| $K_0$ | $h(K_0)$ | $h^2(K_0)$ | $h^3(K_0)$ | $h^4(K_0)$ | $h^5(K_0)$ | $h^6(K_0)$ | $h^7(K_0)$ |
| $h^7(K_1)$ | $K_1$ | $h(K_1)$ | $h^2(K_1)$ | $h^3(K_1)$ | $h^4(K_1)$ | $h^5(K_1)$ | $h^6(K_1)$ |
| $h^6(K_2)$ | $h^7(K_2)$ | $K_2$ | $h(K_2)$ | $h^2(K_2)$ | $h^3(K_2)$ | $h^4(K_2)$ | $h^5(K_2)$ |
| $h^5(K_3)$ | $h^6(K_3)$ | $h^7(K_3)$ | $K_3$ | $h(K_3)$ | $h^2(K_3)$ | $h^3(K_3)$ | $h^4(K_3)$ |
| $h^4(K_4)$ | $h^5(K_4)$ | $h^6(K_4)$ | $h^7(K_4)$ | $K_4$ | $h(K_4)$ | $h^2(K_4)$ | $h^3(K_4)$ |
| $h^3(K_5)$ | $h^4(K_5)$ | $h^5(K_5)$ | $h^6(K_5)$ | $h^7(K_5)$ | $K_5$ | $h(K_5)$ | $h^2(K_5)$ |
| $h^2(K_6)$ | $h^3(K_6)$ | $h^4(K_6)$ | $h^5(K_6)$ | $h^6(K_6)$ | $h^7(K_6)$ | $K_6$ | $h(K_6)$ |
| $h(K_7)$ | $h^2(K_7)$ | $h^3(K_7)$ | $h^4(K_7)$ | $h^5(K_7)$ | $h^6(K_7)$ | $h^7(K_7)$ | $K_7$ |

METHODS AND SYSTEMS FOR GENERATING HOST KEYS FOR STORAGE DEVICES

CROSS-REFERENCE TO RELATED APPLICATION(S)

This application claims priority from Indian Patent Application No. 3480/CHE/2013 entitled "Method and System for Generating Host Keys for Storage Devices" filed on Jun. 27, 2014, in the Indian Patent Office (IPO), the entire contents of which are incorporated herein by reference.

BACKGROUND

1. Field

Example embodiments of the present inventive concepts may relate generally to storage devices. Example embodiments of the present inventive concepts may relate generally to generation and assignment of host keys corresponding to storage devices.

2. Description of Related Art

Flash memory may be used as a storage medium for a variety of computer applications. Flash memory may use electrically-erasable programmable read-only memory (EEPROM) as a non-volatile storage. Secure Flash (SF) may be a Digital Rights Management (DRM) technology applicable to flash memory, aimed at the protection of digital content from unauthorized or pirated usage. The content may be stored onto the media in an encrypted fashion in an SF device.

Enhanced Media Identifier (EMID) and Gamma may be two authentication protocols used in the SF technology. Both EMID and Gamma authentication protocols must be successfully passed when the media is plugged into a host device for content to be successfully decrypted. Typically, on inserting a Secure Flash memory card into a Secure Flash host device, an EMID authentication protocol may be executed using sets of cryptographic keys assigned to the host device and the memory card, respectively. The EMID authentication protocol may pass only if keys assigned to the host device and the memory card are valid.

Generally, cryptographic keys may be assigned to the host device and the memory card using a key management system. The key management may be performed by a host key generation device. The key management system may receive a request for generation of host keys in bulk amounts.

At its core, the key management system of the EMID technology may be a tree data structure called the Key Management Tree (KMT) having a plurality of layers. Each layer of the KMT may constitute one or more nodes. The nodes present at the last layer of the KMT may represent real-world EMID host devices.

Currently, in the key management system, a brute force approach may be used to generate host key sets. Key sets for all nodes may be generated individually. An existing approach may require many additional operations to be performed per node for generating host key sets. This may require enormous amounts of time, thereby affecting the throughput of the host key generation device.

SUMMARY

Some example embodiments of the present inventive concepts may design methods of systems for generating host set keys with higher speed and fewer calculations.

In some example embodiments, a method of generating one or more host key sets for one or more host devices may comprise: generating one or more node key sets for one or more ancestor nodes in a data structure; generating one or more node key sets for one or more leaf nodes in the data structure by using the one or more node key sets of the one or more ancestor nodes; and/or generating the one or more host key sets for the one or more leaf nodes by reusing the generated one or more node key sets of the one or more ancestor nodes and the node key sets of the one or more leaf nodes.

In some example embodiments, the data structure may be a tree data structure.

In some example embodiments, the method may further comprise: identifying one or more common ancestor nodes for the one or more leaf nodes; and/or storing the one or more node key sets corresponding to the one or more common ancestor nodes in a temporary storage module.

In some example embodiments, a method of generating one or more host key sets for one or more host devices may comprise: generating one or more seed keys for one or more nodes in a tree data structure, wherein the tree data structure comprises one or more ancestor nodes and one or more leaf nodes; storing the generated one or more seed keys in a temporary storage module; generating one or more node key sets for the one or more nodes in the tree data structure using the stored one or more seed keys; and/or generating the one or more host key sets for the one or more leaf nodes based on the generated one or more node key sets of the one or more nodes.

In some example embodiments, the one or more node key sets may comprise the one or more seed keys and one or more derivatives of the one or more seed keys.

In some example embodiments, the method may further comprise: storing node information metadata, the generated one or more seed keys, and the generated one or more node key sets of the one or more nodes.

In some example embodiments, a method of generating one or more host key sets for one or more host devices by a host key generation device may comprise: generating one or more seed keys for one or more nodes in a tree data structure, wherein the tree data structure comprises one or more ancestor nodes and one or more leaf nodes; generating one or more node key sets for the one or more nodes based on the generated one or more seed keys, wherein the one or more node key sets comprise seed keys corresponding to each of the one or more nodes and one or more intermediate keys derived from the one or more seed keys; storing the generated one or more seed keys and the one or more intermediate keys in a temporary storage module; and/or generating one or more node key sets for the one or more nodes in the tree data structure by reusing the stored one or more seed keys and the stored one or more intermediate keys.

In some example embodiments, the method may further comprise: generating one or more host key sets for the one or more leaf nodes based on the generated one or more node key sets of the one or more ancestor nodes and the one or more leaf nodes.

In some example embodiments, a system for generating one or more host key sets for one or more host devices may comprise: a node selection module configured to select one or more nodes based on a request; a seed key generation module, connected with the node selection module, configured to generate one or more seed keys for the selected one or more nodes; an intermediate key generation module configured to generate one or more intermediate values from the generated one or more seed keys; a temporary storage module configured to store the generated one or more seed keys and the one or more intermediate values; a node key set generation module configured to generate one or more node key sets from the stored one or more intermediate values and the stored one or more seed keys; and/or a host key set generation module, coupled with the node key set generation module, configured to generate host key sets from the generated one or more node key sets.

In some example embodiments, a method of generating one or more host key sets for one or more host devices may comprise: generating one or more seed keys for one or more nodes in a data structure, wherein the data structure comprises one or more ancestor nodes and one or more leaf nodes; generating one or more node key sets for the one or more nodes in the data structure using the generated one or more seed keys; and/or generating the one or more host key sets based on the generated one or more node key sets.

In some example embodiments, the data structure may be a tree data structure.

In some example embodiments, the method may further comprise: storing the generated one or more seed keys in a temporary storage module.

In some example embodiments, the method may further comprise: storing the generated one or more mode key sets in a temporary storage module.

In some example embodiments, the one or more node key sets may comprise the generated one or more seed keys.

In some example embodiments, the one or more node key sets may comprise the generated one or more seed keys corresponding to each of the one or more nodes.

In some example embodiments, the one or more node key sets may comprise the generated one or more seed keys corresponding to each of the one or more nodes and one or more intermediate keys derived from the generated one or more seed keys.

In some example embodiments, the method may further comprise: storing the generated one or more seed keys and the one or more intermediate keys in a temporary storage module.

In some example embodiments, the generating of the one or more node key sets for the one or more nodes in the data structure may comprise reusing the stored one or more seed keys and the stored one or more intermediate keys.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

The present inventive concepts disclose methods for generating node key sets for each node in key management tree structures. According to the present inventive concepts, keys may be generated using fewer encryption operations. In some example embodiments of the present inventive concepts, the node key sets for common ancestor nodes of various nodes in the tree data structure may be saved and reused for increasing throughput. In some example embodiments of the present inventive concepts, in addition to reusing node key sets of common ancestors, the seed keys used for generating node key sets for each node may be saved and reused for generating node key sets for all nodes. In some example embodiments of the present inventive concepts, all the generated seed keys, as well as the intermediate keys, may be stored in a temporary storage module and may be reused for generating node key sets of all nodes.

Figure 1A:
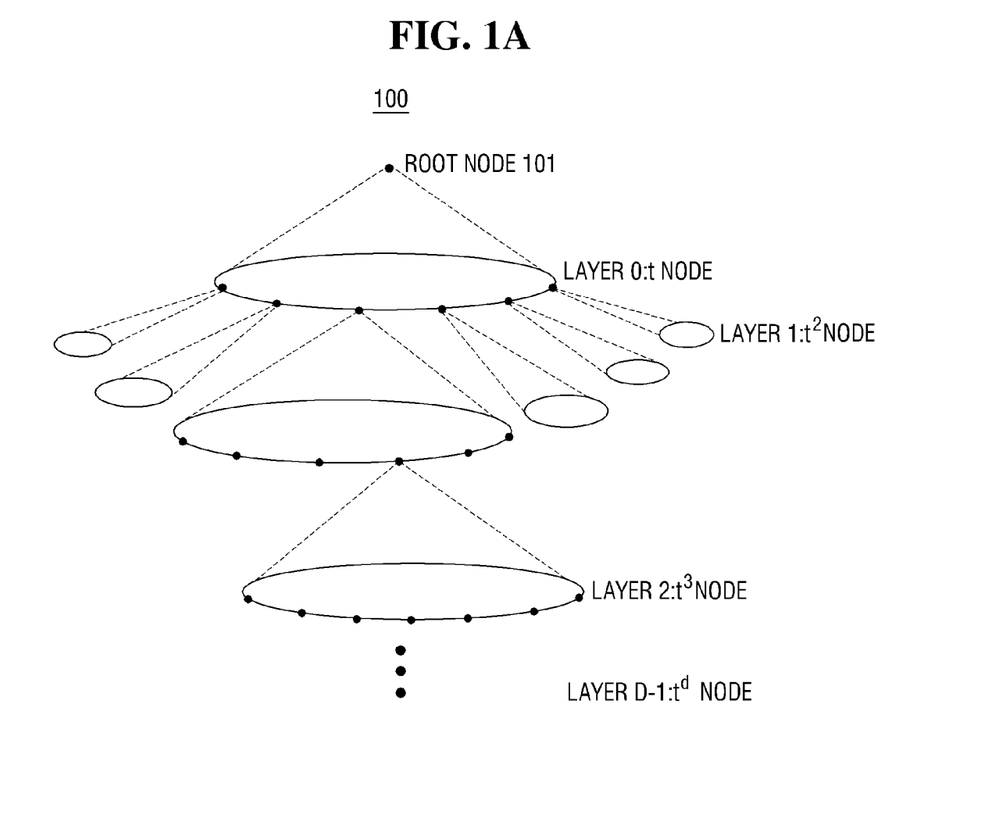
FIG. 1A illustrates a schematic representation of key management tree structure.
Figure 1B:
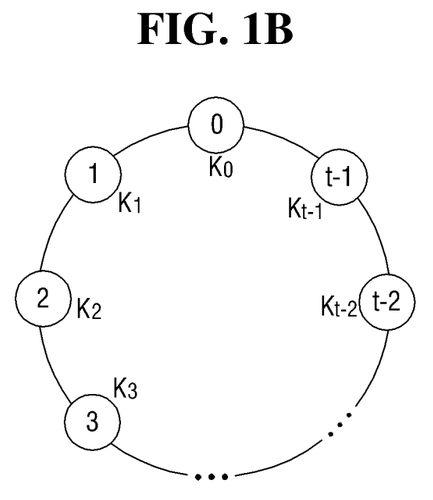
FIG. 1B illustrates a schematic representation of each node in a circular group and seed value key assignment.

FIGS. 1A and 1B illustrate a schematic representation of a key management tree structure. At the core of the key management system of the EMID technology is the tree data structure called the Key Management Tree (KMT). The node 101 is the root node in the key management tree (KMT) 100. A node that generates from any other node is called a child node of that node, and the original node is called a parent node of the corresponding child node.

The KMT 100 has the following properties:
1. It is a t-array tree having 'd' levels (excluding the root node 101). The levels are numbered from Layer 0 to Layer d-1.
2. The leaf nodes of the KMT represent real-world EMID host devices. Further, KMT 100 supports 't*d' host devices for 'd' number of levels (excluding the root node 101).
3. All the 't' nodes belonging to the same parent node form a circular 'group'.
4. The 't' nodes in a circular group are assigned ID's from '0' to 't−1'.
5. A 16-byte random seed value key is assigned to each node according to its ID. The seed value for node T in the group is denoted by Ki for $0 \le i \le (t-1)$.

FIG. 1A explains the generalized structure of the KMT. Typically, the implementation of KMT for EMID technology uses parameters t=16 and d=10. This indicates that each node has 16 child nodes and there exist 10 layers. Therefore, the number of nodes in each layer of KMT is $t$, $t^2$, $t^3$, etc. The number of real-world EMID hosts supported according to above mentioned implementation is $16^{10}=1.1$ trillion (approximate) leaf nodes at Layer 9 of the key management tree.

FIG. 1B illustrates a schematic representation of each node in a circular group and respective seed value key assignments. Each node in a circular group is associated with a set of t (=16) keys (each of 16-byte length) and its own seed key value.

Figure 2A:
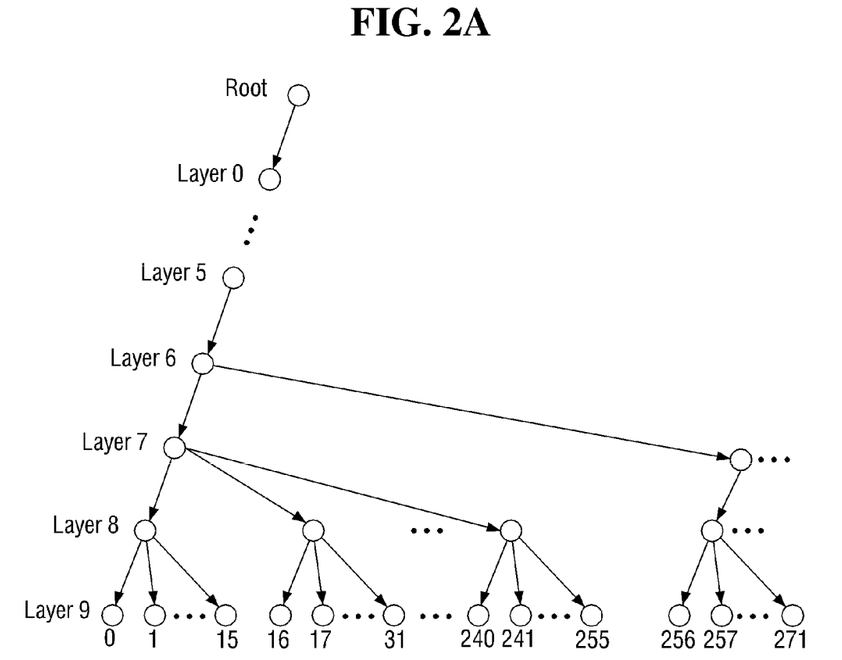
FIG. 2A illustrates a schematic representation depicting the ancestor nodes and leaf nodes.

FIG. 2A illustrates a schematic representation depicting the ancestor nodes and leaf nodes. According to some example embodiments of the present inventive concepts, a first layer of the KMT 100 comprises 16 nodes generated from the root node. All the nodes in Layer 1 are ancestor nodes, since there exist another eight layers under each node of Layer 1. All the nodes in Layer 9 are considered as leaf nodes. Likewise, all the nodes until the 8th layer are considered as the ancestor nodes of the leaf nodes in the 9th layer. For instance, consider leaf nodes 0 to 15, then all the first nodes from Layer 0 to Layer 8 are ancestor nodes for the leaf nodes 0 to 15.

Figure 2B:
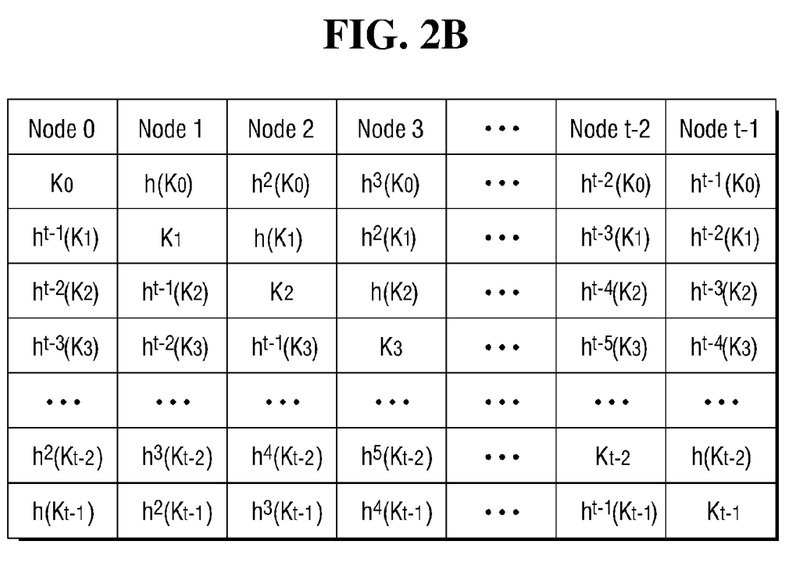
FIG. 2B illustrates a node key set for t-1 nodes present in a KMT.

FIG. 2B illustrates a node key set for 't' nodes present in a KMT. The node key set represents the identity of a node. In order to generate node key set values two types of operations are performed, such as Advanced Encryption Standard (AES) encryption operations and hashing operations. Implementation of the key management system for EMID authentication protocol uses seed value keys for each node. The seed keys are generated using AES operations. The number of AES encryption operations depends on the number of nodes present in a layer. Further, a hashing operation is required to be performed for each of the seed keys. Further, in order to generate one complete node key set, hashing operations are required. For instance, the number of hashing operations performed to generate node key sets for 16 nodes is stated as follows.

The key set for node i ($0 \leq i \leq t-1$), is a sequence of key values $k_i$, n ($0 \leq n \leq t-1$), $k_i$, n=h((i+t−n)mod t)($K_n$)

The function 'h' in the above equation is the SHA-1 hash function with the slight modification that it returns the 128 most significant bits of the 160-bit generated SHA-1 hash. The exponent of the function 'h' denotes the number of times the modified SHA-1 hash function is to be iteratively applied. The equation generates key sets as shown in FIG. 2B (each column is the key set for the corresponding node).

Each leaf node of the KMT corresponds to a unique real world EMID host, and each host device stores a unique set of keys called a host key set. These host key sets are collections of the corresponding node key set of the leaf nodes and the key sets of all ancestor nodes of the leaf nodes for the lower 8 layers (e.g., Layers 2, 3, . . . , 9 in KMT for EMID).

Figure 3:
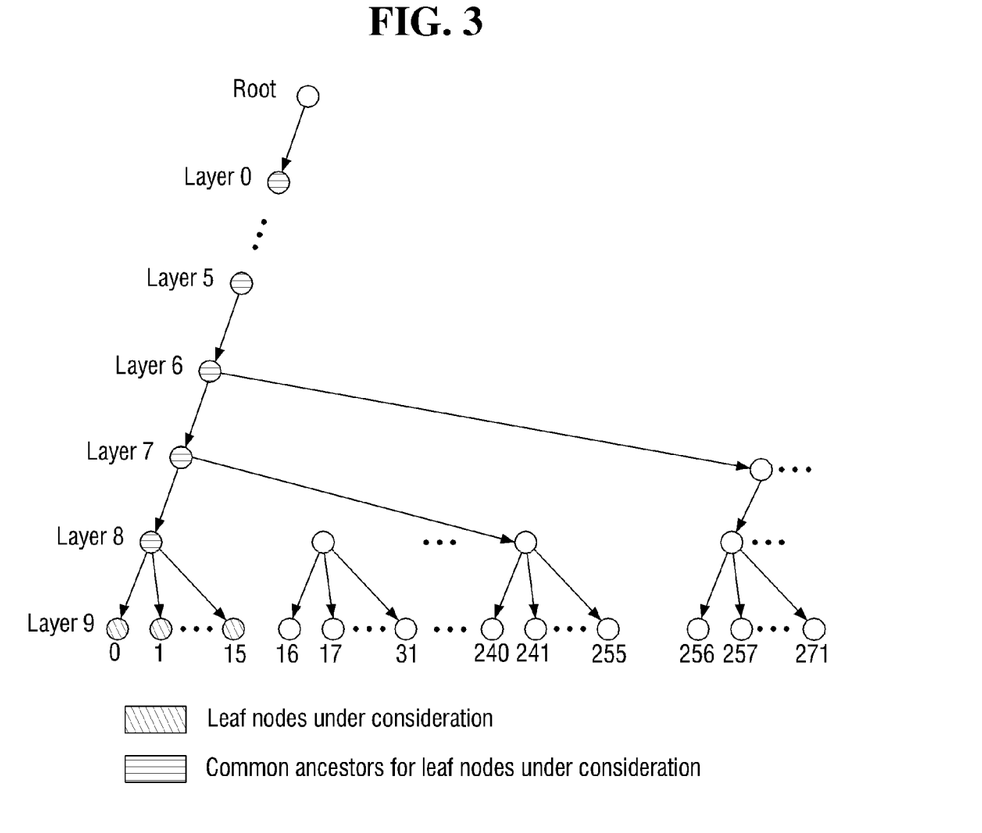
FIG. 3 illustrates a schematic representation depicting the common ancestor nodes and leaf nodes under consideration according to some example embodiments of the present inventive concepts.

FIG. 3 illustrates a schematic representation depicting the common ancestor nodes and leaf nodes under consideration according to some example embodiments of the present inventive concepts.

The host key set generation according to the present inventive concepts supports higher throughput in case of bulk requests. Typically, the leaf nodes are allocated sequentially. Consider that the leaf nodes of the KMT are numbered sequentially from 0 at the leftmost node to $16^{10}-1$ to the rightmost node. The leaf node allocation is performed sequentially. If the key management system receives a bulk request for the generation of 'N' number of host key sets starting from leaf node number 'X', the leaf nodes for which host key sets are generated are leaf nodes X to X+N−1.

Consider a request for 'N' host key sets and the requested N leaf nodes are not available in a single sequence, then the request for 'N' host key sets is split into a maximum of two sequential leaf node chains. Then 'M' number of nodes from the 'N' number of leaf nodes is allocated starting from leaf node X, while the rest of the (N−M) nodes maybe allocated starting from some other leaf node Y. In some example embodiments, 'M' is less than 'N' (e.g., M<N). The leaf nodes allocated in this case would be X to X+M−1 and Y to Y+(N−M)−1.

As a result of the sequential allocation, many of the adjacent leaf nodes being processed will have a number of common ancestor nodes, depending on the placement of these leaf nodes in the KMT. For instance, consider leaf nodes numbered 0 (leftmost leaf node of the KMT) and 1 (the leaf node immediately next to it). These two leaf nodes have all common ancestor nodes from Layer 8 upwards as shown in FIG. 3. Likewise, consider leaf nodes numbered 15 and 16. These leaf nodes belong to different parent nodes on Layer 8, but have all common ancestor nodes from Layer 7 upwards. Similarly, leaf nodes numbered 255 and 256 have all common ancestor nodes from Layer 6 and upwards. The leaf nodes under consideration and common ancestor nodes are illustrated in FIG. 3.

Figure 4:
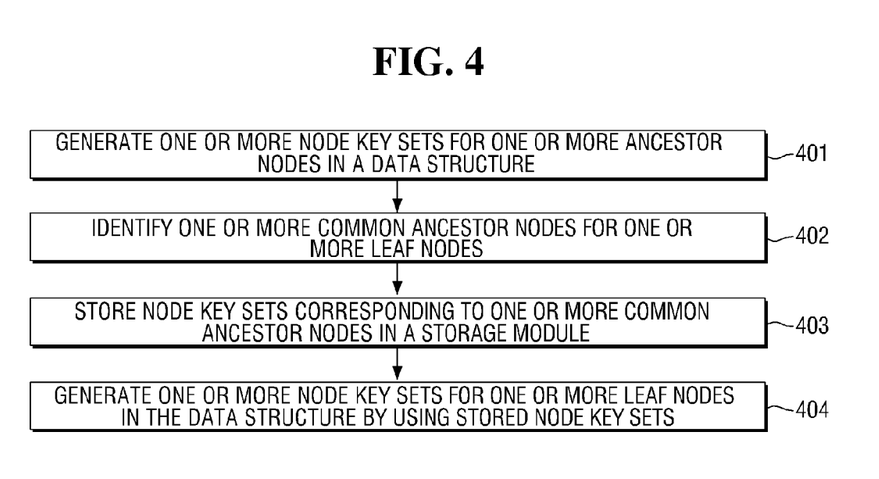
FIG. 4 illustrates a method of generating host key sets for one or more host devices, according to some example embodiments of the present inventive concepts.

FIG. 4 illustrates a method of generating host key sets for one or more host devices, according to some example embodiments of the present inventive concepts.

Requests for host key sets to the EMID key management system (key issuer) may be received in bulk amounts in practical implementations. The system may be required to support the generation of host key sets for up to 400,000 or more hosts in a single request.

The generation of node key sets using the present method is based on the presence of common ancestor nodes. In some example embodiments of the present inventive concepts, at step 401 one or more node key sets are generated for one or more ancestor nodes in a data structure. The host key set of a leaf node contains a node key set of the leaf node and node key sets of ancestor nodes. Therefore, one or more common ancestor nodes are identified at step 402 for one or more requested leaf nodes. The node key sets of common ancestor nodes are stored in a temporary storage module as shown in step 403. Further, at step 404, one or more node key sets for one or more leaf nodes are generated using the stored node key sets of the ancestor nodes.

For example, consider the scenario that no host key sets are currently assigned, and the system receives a request for 16 node key sets. In this scenario, leaf nodes numbered 0 to 15 are allocated and node key sets will be generated for them. For leaf node 0, the system has to compute all the 8 node key sets for the ancestor nodes up until Layer 2 of the KMT. In the case of leaf node 1, as previously explained, leaf nodes 0 and 1 have all common ancestor nodes from Layer 8 upwards. As a result, the node key sets of ancestor nodes from Layer 8 to Layer 2 are the same for leaf node 0 and leaf node 1. The only differing node key set is of Layer 9 (e.g., of the leaf node 1). Hence, if the node key sets calculated for leaf node 0 are cached in memory, recalculation of seven of the eight node key sets can be avoided for leaf node 1. Further, leaf nodes numbered 2 to 15 share the same ancestor nodes from Layer 8 upwards. Thus, the same cached key sets can be reused for the leaf nodes 1 to 15.

Further, in order to generate one complete node key set, hashing operations are required. For instance, the number of hashing operations performed to generate node key sets for 16 nodes is stated as follows.

Number of hashing operations in proposed approach= (Number of hashing operations for leaf node 0)+15*(Number of hashing operations for each of leaf nodes 1 to 15.

=(8*120)+15*(1*120)=2,760

In continuation with the stated example of request for generation of 16 nodes, consider that after allocation of the first 16 leaf nodes, the system receives a request for 16 more host key sets. To service this request, leaf nodes numbered 16 to 31 are to be allocated by generating host key sets for each leaf node. In some example embodiments of the present inventive concepts, the host key set of leaf node 15 is stored in the temporary storage module. The leaf nodes numbered 15 and 16 have common ancestor node from Layer 7 upwards as shown in FIG. 3. Thus, for ancestors of Layers 2 to 7, node key sets can be reused from the temporary storage module. The node key sets of Layers 8 and 9 are calculated. The node key set of leaf node 16 has been generated and stored in the temporary storage module. For the remaining leaf nodes from 17 to 31, ancestor nodes of Layer 8 and above are common. Hence, only node key sets for Layer 9 (e.g., the leaf nodes) are newly calculated.

The ancestor node key sets generated for a particular leaf node are cached in an in-memory data structure, along with certain additional metadata. The temporary storage module is designed as a table including seven entries, one corresponding to each of the layers from Layer 2 to Layer 8. Each entry of the temporary storage module includes:

a. Node Information Metadata—this information is used to uniquely identify a node in the tree.

b. Corresponding node key set (set of 16 keys).

The structure of the temporary storage module is shown in Table 1.

TABLE 1

| Layer Number | Node Information Metadata | Key Set of Node | | | |
|---|---|---|---|---|---|
| | | $k_{i,0}$ | $k_{i,1}$ | ... | $k_{i,15}$ |
| 2 | | | | | |
| 3 | | | | | |
| ... | | | | | |
| 8 | | | | | |

Whenever a node key set is to be generated for a leaf node, it is determined whether the previously stored ancestor node key sets in the temporary storage module can be reused for generating a node key set for the leaf node. The node information metadata for each layer entry in the temporary storage module is scanned to determine whether the stored entry is an ancestor of the current leaf node. If 'yes', the node key set is directly used from the temporary storage module. Otherwise, a new node key set is generated and overwritten in the temporary storage module.

Figure 5:
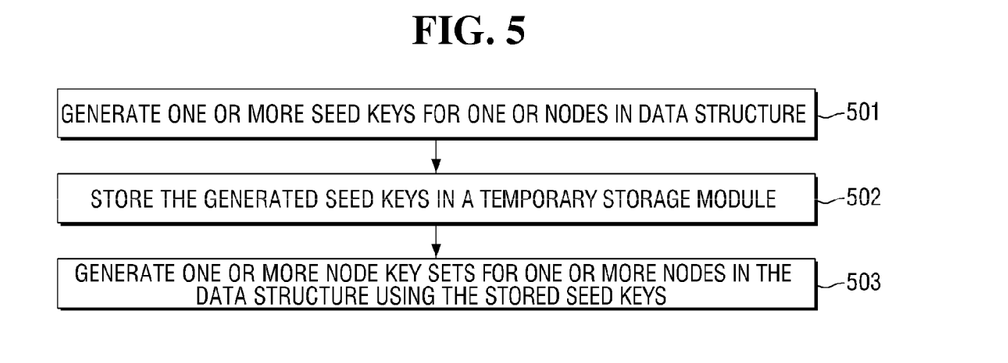
FIG. 5 illustrates a method of generating host key sets for one or more host devices, according to some example embodiments of the present inventive concepts.

FIG. 5 illustrates a method of generating host key sets for one or more host devices, according to some example embodiments of the present inventive concepts. In order to generate node key sets, a seed key has to be encrypted for each node of KMT 100, as shown in step 501. This is performed using AES encryption operations. At step 502, these generated seed keys are stored in the temporary storage module. Accordingly, the stored seed keys are reused for generation of node key sets of the nodes to be allocated for each host device. Each node key set comprises at least one seed key and one or more derivatives of seed keys of other sibling nodes. At step 503, the node key sets are generated for one or more nodes in the tree data structure using the stored seed keys.

For example, consider that there is a request for 16 host keys. The generation of seed keys for each node requires at least one AES encryption operation. Also, node key sets for each node use seed keys of all the 16 sibling nodes. The seed keys are stored in a temporary storage module in order to ensure that once these 16 seed keys are generated for any one node, they can be reused by all the nodes associated with same ancestor.

Figure 6:
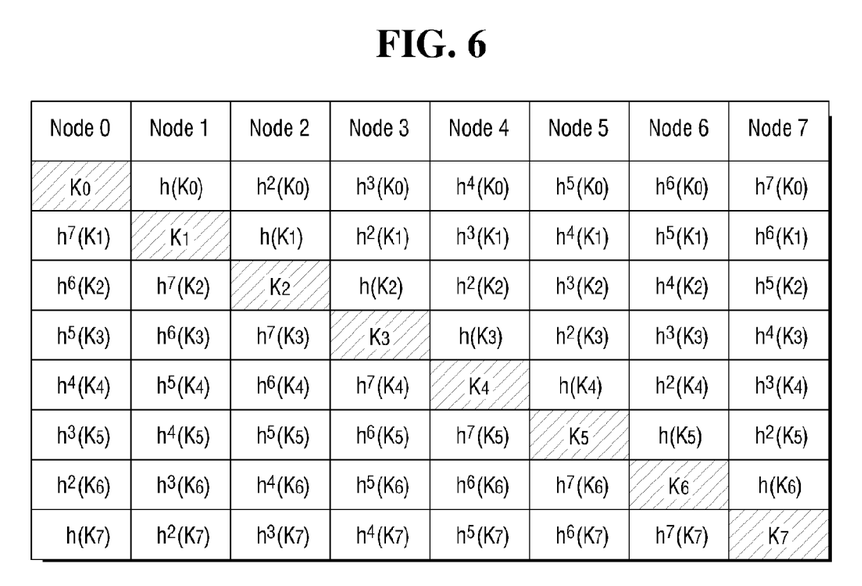
FIG. 6 illustrates a schematic representation of distribution of seed keys for each node, according to some example embodiments of the present inventive concepts.

The structure of the temporary storage module involves variations with respect to the structure mentioned in FIG. 4, to incorporate seed keys of all of the nodes of the groups. The term 'group' refers to a set of child nodes belonging to the same parent node. A schematic representation of distribution of seed keys for each node is illustrated in FIG. 6.

Each entry of the temporary storage module includes:
a. Node Information Metadata—this information is used to uniquely identify a node in the tree.
b. Random seed value keys of all nodes of the group to which the node belongs (set of 16 keys, K0 to K15).
c. Corresponding node key set (set of 16 keys).

The structure of the temporary storage module is shown in Table 2 shown below.

TABLE 2

| Layer Number | Node Information Metadata | Group Random Seed Value Keys | | | | Key Set of Node | | | |
|---|---|---|---|---|---|---|---|---|---|
| | | $K_0$ | $K_1$ | ... | $K_{15}$ | $k_{i,0}$ | $k_{i,1}$ | ... | $k_{i,15}$ |
| 2 | | | | | | | | | |
| 3 | | | | | | | | | |
| ... | | | | | | | | | |
| 9 | | | | | | | | | |

Figure 7:
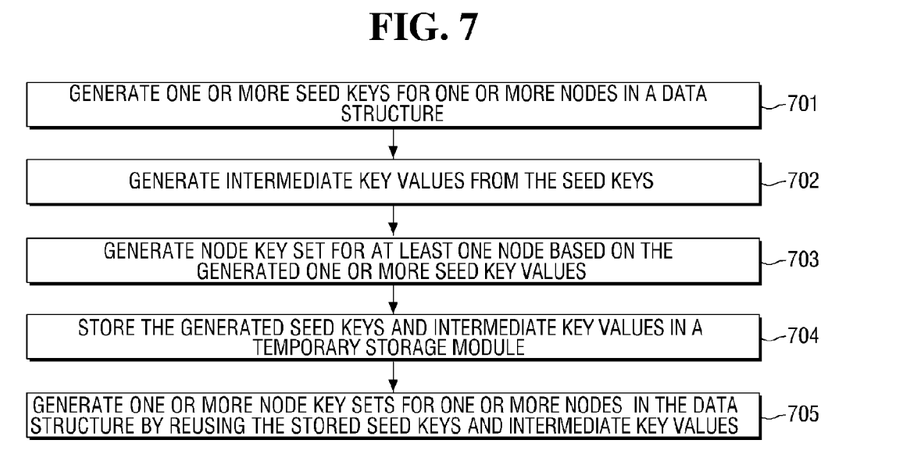
FIG. 7 illustrates method of generating host key sets for one or more host devices, according to some example embodiments of the present inventive concepts.

FIG. 7 illustrates a schematic representation of distribution of seed keys and intermediate key values for each node, according to some example embodiments of the present inventive concepts. At step 701, one or more seed keys are generated for one or more nodes in a tree data structure. At step 702, intermediate key values are generated from the seed keys. Further, at step 703, a node key set for at least one node is generated based on the generated one or more seed keys. The node key set comprises one or more seed keys and one or more intermediate key values derived from the seed keys. The intermediate key values are generated by performing hashing operations on the seed keys. The generated intermediate key values are stored in the temporary storage module at step 704. At step 705, one or more node key sets are generated for one or more nodes in the tree data structure by reusing the stored seed keys and intermediate key values.

Figure 8:
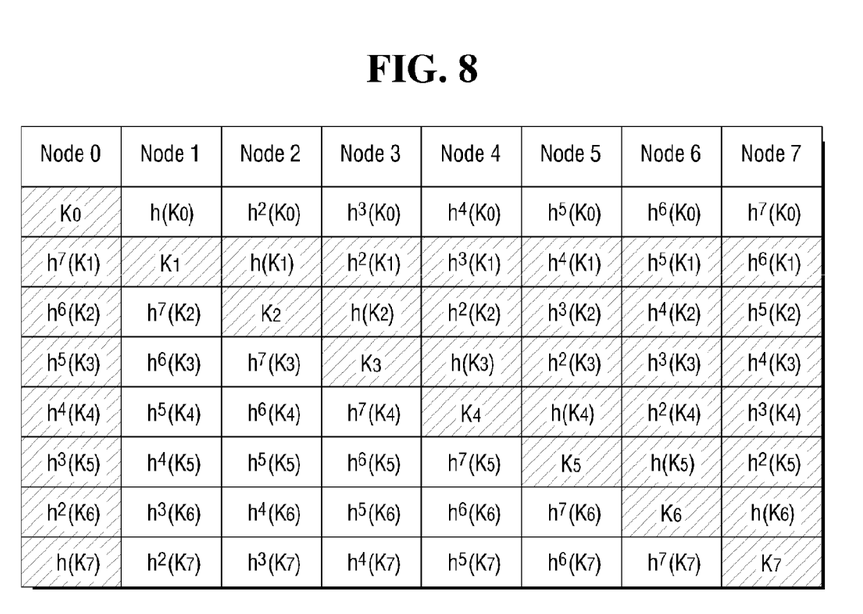
FIG. 8 illustrates a schematic representation of distribution of seed keys and intermediate key values for each node, according to some example embodiments of the present inventive concepts.

FIG. 8 illustrates a schematic representation of distribution of seed keys and intermediate key values for each node for the node key sets in a group of nodes for t=8. Assume that in this scenario, no host key sets are currently assigned, and the system receives a request for 8 host key sets. The leaf nodes numbered 0 to 7 have to be allocated and host key sets have to be generated for each of these nodes. As t=8 here, leaf nodes 0 to 7 form a complete group, the leftmost group on Layer 9 as shown in FIG. 2A.

The host key set of leaf node 0 contains the seed key set of leaf node 0 as well as intermediate key sets of all its ancestor nodes up to Layer 2. The generation of aforesaid node key set involves calculation of the following values:
a. $K_0$ to $K_7$
b. $h^7(K_1)$, $h^6(K_2)$, $h^5(K_3)$, $h^4(K_4)$, $h^3(K_5)$, $h^2(K_6)$, $h(K_7)$ From the above information, it is clear that the values in the node key set are obtained by a multitude of hashing operations performed on the random seed value keys for nodes 1 to 8. The keys of interest for this method of generating host keys are intermediate keys and seed keys. The following intermediate hash keys are generated while processing the host key set of leaf node 0:
i. $h(K_1)$ to $h^6(K_1)$
ii. $h(K_2)$ to $h^5(K_2)$
iii. $h(K_3)$ to $h^4(K_3)$
iv. $h(K_4)$ to $h^3(K_4)$
v. $h(K_5)$ and $h^2(K_5)$
vi. $h(K_6)$ The above listed intermediate values are used in the key sets of leaf nodes 2 to 7. For instance, leaf node 2 uses $h(K_1)$, node 3 uses $h^2(K_1)$ and $h(K_2)$, and so on. This shows that these intermediate hash values, which are calculated for key set of leaf node 0, can be stored in order to negate the recalculation of these values for the other nodes belonging to the same group. Hence, all the intermediate keys and the seed keys are saved as illustrated in FIG. 8. The entries in the shaded portion of the table depict the seed keys and intermediate keys stored when the first node set key is generated for node 0. According to this particular example of generation of node key set for 8 nodes, 36 of the total 64 entries in FIG. 8 are filed in first instance (e.g., more the half the table can be filled up during the generation of the key set of leaf node 0 itself). The current mechanism aims at avoiding recalculation of precisely such values. The process of storing of intermediate hash values is equally applicable to all the ancestor nodes.

In the case of node 1, the node key set values are calculated once the node key sets of all the ancestors of leaf node 0 up until Layer 2 have been calculated. It can be observed that one value, $K_1$, can be used directly from the temporary storage module and all the other seven values can be obtained by exactly one hash operation each on the values in the first column of FIG. 8. Thus, it can be trivially deduced that the generation of the host key set of leaf node 1 would require a total of 7 hashing operations. Likewise, the number of hashing operations reduces for the nodes 3 to 7 and, at node 7, only one hashing operation is required.

Figure 9:
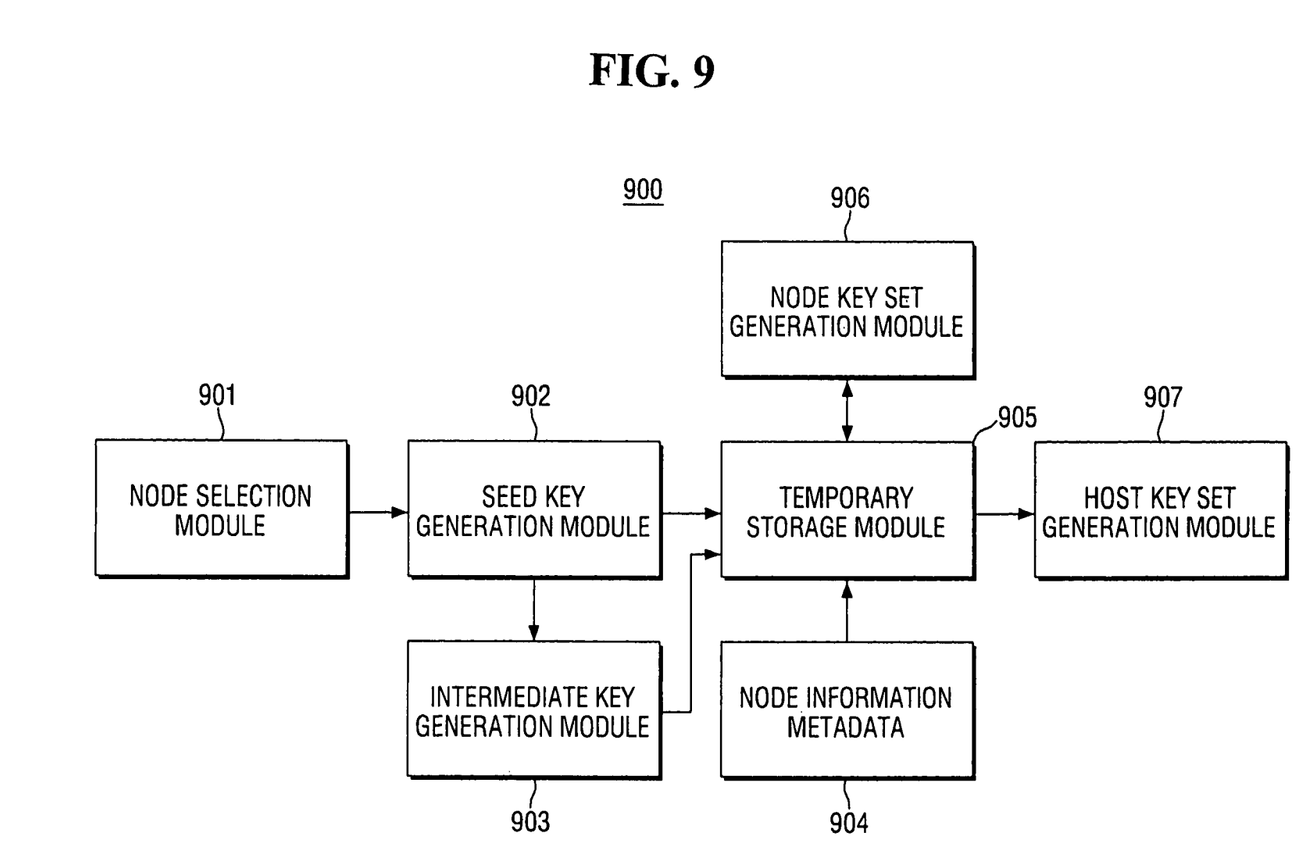
FIG. 9 illustrates a block diagram of system for generating host key sets for one or more host devices, according to some example embodiments of the present inventive concepts.

FIG. 9 is a block diagram of system for generating host key sets for one or more host devices, according to some example embodiments of the present inventive concepts. According to some example embodiments of the present inventive concepts, a node key set generating unit 900 includes a node selection module 901, a seed key generation module 902, an intermediate key generation module 903, node information metadata 904, a temporary storage module 905, a node key set generation module 906, and a host key set generation module 907.

The node selection module 901 selects the number of nodes in a key management tree, for one or more requested number of host keys. The request of huge number of host keys makes continuous allocation of leaf nodes impossible. In such cases, the node selection module 901 allocates the leaf nodes based on the availability. The seed key generation module 902 generates seed keys for required nodes as per request. The intermediate key generation module 903 generates the intermediate keys required for the generation of node key sets. Values derived from the seed key generation module and intermediate key generation module are stored in a temporary storage module 905. Moreover, the metadata available in node information metadata 904 is also fed to the temporary storage module 905 for the generation of node key sets. The metadata is used to uniquely identify a node in the tree. Further, the node key set generation module 906 generates the requested node key sets. The generated node key sets are stored in the temporary storage module 905. The node key set generation module 906 is coupled with the host key set generation module 907. The host key set generation module 907 generates host key sets for leaf nodes from the node key set of corresponding leaf nodes and node key sets of all the ancestor nodes stored in the temporary storage module 905.

The algorithms discussed in this application (e.g., for generating host key sets) may be used in more general purpose apparatuses and/or methods. For example, the algorithms may be used in apparatuses and/or methods for more general electrical or electronic systems in the cryptographic field.

The methods described above may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., Read-Only Memory (ROM), Random-Access Memory (RAM), Universal Serial Bus (USB), floppy disks, hard disks, etc.) and optical recording media (e.g., Compact Disc Read-Only Memories (CD-ROMs) or Digital Video Discs (DVDs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

That which is claimed:

1. A method of generating one or more host key sets for one or more host devices, the method comprising:
   generating one or more node key sets for one or more ancestor nodes in a data structure;
   identifying all common ancestor nodes for one or more leaf nodes in the data structure;
   storing the generated one or more node key sets corresponding to the identified common ancestor nodes in a temporary storage module;
   generating one or more node key sets for the one or more leaf nodes in the data structure by reusing the stored one or more node key sets of the identified common ancestor nodes; and
   generating the one or more host key sets for the one or more leaf nodes by reusing the stored one or more node key sets of the identified common ancestor nodes and the generated one or more node key sets of the one or more leaf nodes.

2. The method of claim 1, wherein the data structure is a tree data structure.

3. A method of generating one or more host key sets for one or more host devices by a host key generation device, the method comprising:
   generating one or more seed keys for one or more nodes in a tree data structure, wherein the tree data structure includes one or more ancestor nodes and one or more leaf nodes;
   generating one or more node key sets for the one or more ancestor nodes based on the generated one or more seed keys, wherein the generated one or more node key sets of the one or more ancestor nodes include the generated one or more seed keys corresponding to each of the one or more ancestor nodes and one or more intermediate keys derived from the generated one or more seed keys;
   storing the generated one or more seed keys and the derived one or more intermediate keys in a temporary storage module;
   identifying all common ancestor nodes for the one or more leaf nodes in the tree data structure; and
   generating one or more node key sets for the one or more leaf nodes in the tree data structure by reusing the stored one or more seed keys and the stored one or more intermediate keys of the identified common ancestor nodes.

4. The method of claim 3, further comprising:
   storing the generated one or more node key sets corresponding to the identified common ancestor nodes in the temporary storage module; and
   generating one or more host key sets for the one or more leaf nodes by reusing the stored one or more node key sets of the identified common ancestor nodes and the generated one or more node key sets of the one or more leaf nodes.

5. A method of generating one or more host key sets for one or more host devices, the method comprising:
   generating one or more seed keys for one or more nodes in a data structure, wherein the data structure includes one or more ancestor nodes and one or more leaf nodes;
   generating one or more node key sets for the one or more ancestor nodes in the data structure using the generated one or more seed keys;
   identifying all common ancestor nodes for the one or more leaf nodes in the data structure;
   storing the generated one or more node key sets corresponding to the identified common ancestor nodes in a temporary storage module;
   generating one or more node key sets for the one or more leaf nodes in the data structure by reusing the stored one or more node key sets of the identified common ancestor nodes; and
   generating the one or more host key sets by reusing the stored one or more node key sets of the identified common ancestor nodes and the generated one or more node key sets of the one or more leaf nodes.

6. The method of claim 5, wherein the data structure is a tree data structure.

7. The method of claim 5, further comprising:
   storing the generated one or more seed keys in the temporary storage module.

8. The method of claim 5, further comprising:
   storing the generated one or more node key sets of the one or more leaf nodes in the temporary storage module.

9. The method of claim 5, wherein the generated one or more node key sets of the one or more ancestor nodes include the generated one or more seed keys.

10. The method of claim 5, wherein the generated one or more node key sets of the one or more ancestor nodes include the generated one or more seed keys corresponding to each of the one or more ancestor nodes.

11. The method of claim 5, wherein the generated one or more node key sets of the one or more ancestor nodes include the generated one or more seed keys corresponding to each of the one or more ancestor nodes and one or more intermediate keys derived from the generated one or more seed keys.

12. The method of claim 11, further comprising:
   storing the generated one or more seed keys and the derived one or more intermediate keys in the temporary storage module.

13. The method of claim 12, further comprising:
   generating the one or more node key sets for the one or more leaf nodes in the data structure by reusing the stored one or more seed keys and the stored one or more intermediate keys of the identified common ancestor nodes.

* * * * *